Figure 1:
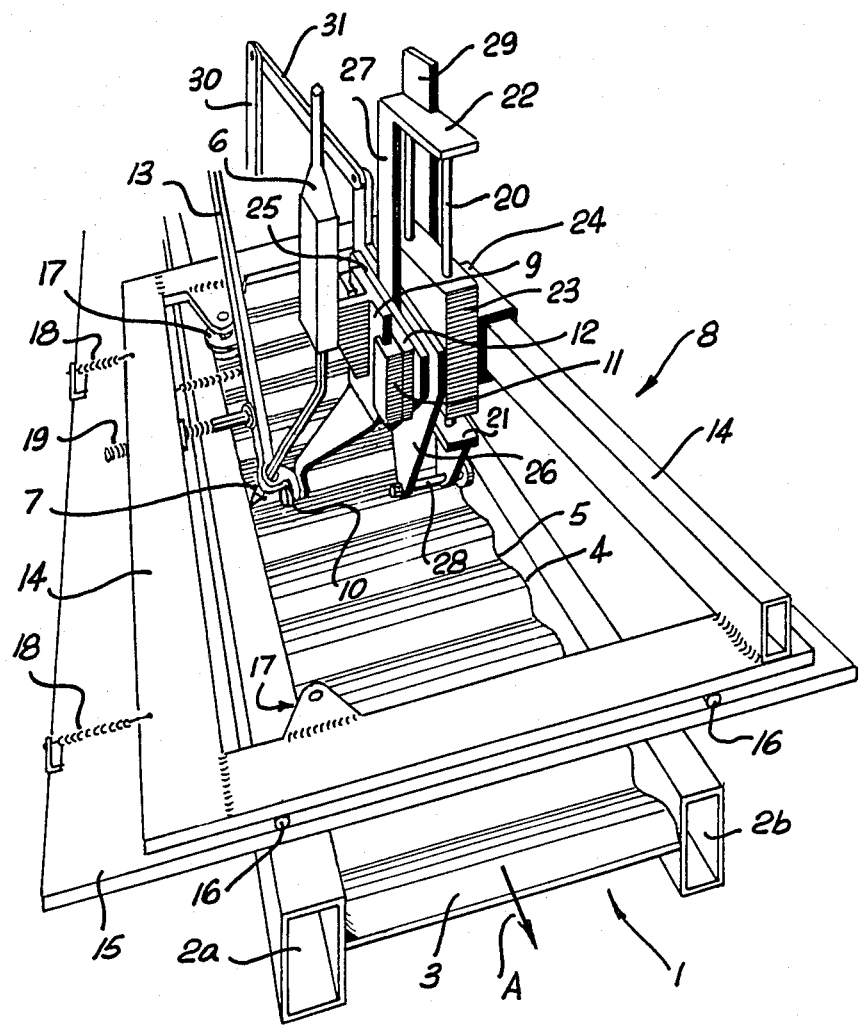

United States Patent [19]

Warczak

[11] Patent Number: 4,750,663

[45] Date of Patent: Jun. 14, 1988

[54] APPARATUS AND METHOD FOR FABRICATING PLATE WEB GIRDERS

[75] Inventor: Franciszek Warczak, Cabramatta, Australia

[73] Assignee: Folded Web Beams Pty. Ltd., Castle Hill, Australia

[21] Appl. No.: 909,176

[22] Filed: Sep. 19, 1986

[51] Int. Cl.$^4$ .................. B23K 5/24; B23K 9/225; B23P 17/00

[52] U.S. Cl. .................. 228/102; 228/182; 228/9; 228/25; 228/32; 228/47; 29/155 R; 219/124.33; 219/124.34

[58] Field of Search .................. 228/6.1, 7, 9, 25, 26, 228/32, 47, 102, 189, 182; 29/155 R; 219/124.33, 124.34

[56] References Cited

U.S. PATENT DOCUMENTS

| | | | |
|---|---|---|---|
| 3,260,438 | 7/1966 | Bergantini | 228/6.1 |
| 3,433,732 | 5/1969 | Wall, Jr. et al. | 228/7 |
| 3,510,626 | 5/1970 | Hasegawa | 219/124.33 |
| 3,709,423 | 1/1973 | Hano et al. | 228/6.1 |
| 3,870,853 | 3/1975 | Reinhardt et al. | 228/25 |
| 3,880,340 | 4/1975 | Takeuchi et al. | 228/6.1 |

FOREIGN PATENT DOCUMENTS

| | | | |
|---|---|---|---|
| 74376 | 6/1981 | Japan | 219/124.33 |
| 148078 | 9/1983 | Japan | 219/124.33 |

Primary Examiner—Nicholas P. Godici
Assistant Examiner—Samuel M. Heinrich
Attorney, Agent, or Firm—Sheldon Palmer

[57] ABSTRACT

An apparatus and method for fabricating plate web girders of the ind comprising two flanges spaced apart by a web. The apparatus comprises a plurality of welding devices each mounted on respective spaced apart guides to follow a respective portion of a welding path defined by the intersection of the web and a flange and an arrangement to move the girder longitudinally relative to the welding devices at a substantially constant rate. The guides bear against the web adjacent the respective welding paths and against the flange to maintain the welding devices at predetermined distances from the web and flange respectively. The apparatus can also include a member to follow the corrugations of a corrugated web and operate limit switching devices when the crests and troughs of each corrugation are encountered. The limit switches operate a modulating motor which adjusts the welding device to maintain the welding angle between the welding path and welding device substantially constant for each point along the path. A corresponding method of fabricating a plate web girder is also disclosed.

15 Claims, 2 Drawing Sheets

APPARATUS AND METHOD FOR FABRICATING PLATE WEB GIRDERS

This invention relates to an apparatus and a method of fabricating plate web girders. The invention was developed primarily for fabricating girders of the kind which comprise a corrugated web interposed between a pair of flanges, and will be described hereinafter with reference to that use. However, it may be used to fabricate any type of plate web girder. As used herein the term corrugated web means a web corrugated in any manner so as to have crests and troughs formed therein including webs with non-parallel corrugations.

Hitherto, the method utilized for fabricating such girders comprises the step of tack welding the flanges to the web in an appropriate configuration, followed by the step of continuously welding the tack welded girder from a central location towards its respective ends.

Such a method overcomes the problem of buckling which is a result of thermal stresses caused by isolated heat inputs during welding.

Whilst being suitable for overcoming the aformentioned buckling problem, the fabrication of a girder according to the method is time consuming.

It is an object of this invention to provide an apparatus and a method for fabricating a plate web girder, which will be overcome or at least ameliorate this disadvantage.

Accordingly, in one aspect this invention consists in an apparatus for fabricating a plate web girder of the kind comprising two flanges spaced apart by a web, said apparatus comprising a plurality of welding devices each mounted on respective spaced apart guides to follow a respective portion of a welding path defined by the intersection of said web and a flange; and means to move said girder longitudinally relative to said welding devices.

In a second aspect this invention consists in a method of fabricating a plate web girder of the kind comprising two flanges spaced apart by a web, said method comprising the steps of positioning said flanges relative to said web, positioning a plurality of welding devices at spaced apart locations along said girders, said devices being adapted to follow a respective portion of a welding path defined by the intersection of said web and a flange; actuating said devices and simultaneous moving said girder longitudinally relative to said devices.

In one embodiment it is preferred that the girder is moved at a substantially constant rate. However it is also within the scope of this invention to vary the rate to achieve a constant speed of the welding device along the welding path for corrugated web girders.

For preference, the welding devices are positioned at in a linear array equally spaced apart locations and the girder is moved for a distance equal to the distance between adjacent devices.

It is also preferred that each guide bears against the web adjacent the respective welding path to maintain the welding device at a predetermined distance from the web at each point along the path.

Each guide preferrably also includes means to bear against the flange to maintain the welding device at a predetermined distance from said flange adjacent the respective welding path.

The apparatus and method of this invention has been found to be suitable for fabricating plate web grids having corrugated webs although the welding angle between the welding path varies as the guide traverses the crests and troughs of the corrugations.

Accordingly, it is further preferred that the welding angle between the respective weld path and the respective welding device is maintained substantially constant for each point along the path. Preferably the welding angle is less than 15 degrees from vertical in a direction forward of the weld.

In one embodiment the welding angle is maintained by adjusting the respective welding devices in response to movement of the guide over the corrugations of the web.

Figure 2:
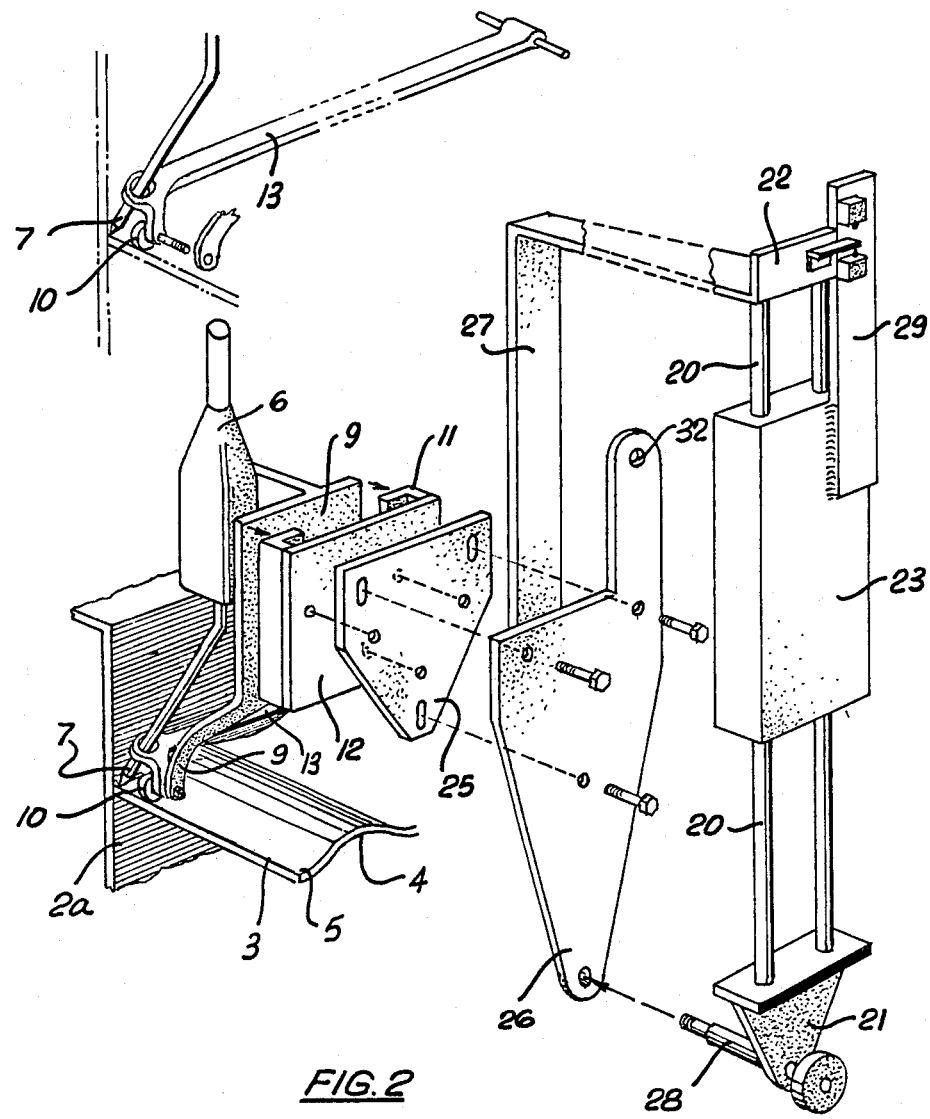

One embodiment of this invention will now be described, by way of example only with reference to the accompanying drawings in which:

FIG. 1 is a schematic perspective view of part of the apparatus according to this invention; and FIG. 2 is an exploded perspective detail of part of the apparatus of FIG. 1.

FIGS. 1 and 2 show part of the apparatus for fabricating a plate web girder 1 comprising two flanges 2a, 2b spaced apart by a corrugated web 3. The corrugated web 3 is formed with successive crests 4 and troughs 5.

The apparatus comprises a plurality of welding devices equally spaced apart in linear array. FIG. 1 illustrates only one such device which takes the form of a welding gun 6 which is connected with a MIG wire feed welder (not shown) in the conventional manner. Each gun 6 has a welding tip 7 and is mounted on a respective spaced apart guide indicated generally at 8. Again FIG. 1 shows only one such guide, however, each guide is identical.

With the aid of guide 8 the welding tip 7 of gun 6 follows a portion of the welding path defined by the intersection of web 3 and flange 2a. The apparatus includes an electrically driven worm screw (not shown) which is connected to the girder 1 and constitutes means to move the girder longitudinally in the direction shown by arrow A relative to the gun 6 at a substantially constant rate.

The gun 6 is clamped to a mounting bracket 9 forming part of guide 8. Mounting bracket 9 is fitted with a roller 10 which bears against the web 3 adjacent the welding path and welding tip 7. Bracket 9 is slideably mounted in grooved blocks 11 in turn mounted on a support plate 12. This allows roller 10 to follow the surface of web 3 by bracket 9 sliding in blocks 11 as the girder moves past the roller. In this way the welding tip is maintained at a predetermined distance from the web 3 at each point along the welding path.

A support arm 13 is used to locate welding tip 7. Although not shown in FIG. 1 this arm 13 extends toward the remote end of the girder 1 sufficiently to suit the sharpness of the corrugations in web 3 and is hingedly mounted. The arm 13 has a comparatively long length so that movement of the welding tip 7 up and down as roller 10 passes over web 3 is not inhibited.

Guide 8 also includes a frame 14 which rests on a base plate 15 above flanges 2a, 2b. Rollers 16 are provided between the frame 14 and base plate 15. Two further rollers 17 are mounted on frame 14 and held in contact with flange 2a under the action of two springs 18 acting on frame 14. An adjustable stop 19 extends from frame 14 and arm 13 is held against stop 19 by a spring connected between arm 13 and frame 14. The welding tip 7 is thus maintained at a predetermined distance from the flange 2a adjacent the welding path at each point along the path by rollers 17 bearing against flange 2a. The distance is adjusted by adjusting the length of stop 19.

The angle between the welding tip 7 and the welding path is preferably less than 15 degrees from vertical in a direction forward of the weld. As the gun 6 moves over the web 3 this angle will change as the path follows the crests and troughs of the web. To improve the quality of the weld this welding angle is maintained substantially constant by moving the mounting bracket 9 to which welding gun 6 is clamped. The means to maintain the welding angle comprises a member formed by a pair of rods 20 supported by a roller arrangement 21. Roller arrangement 21 follows the corrugations of web 3 and the upper ends of rods 20 are joined by a bracket 22. Rods 20 pass through a mounting block 23 which is in turn mounted with frame 14 by means of a sliding sleeve 24 over the frame. This ensures the rods 20 are free to move up and down as roller arrangement 21 passes over web 3. The sleeve 24 allows the whole member to move longitudinally of the girder.

The roller arrangement 21 is connected to support plate 12 by means of connecting plates 25,26. Plate 25 is bolted to plate 12 through slotted bolt holes to allow relative movement between the plates. Plates 25 and 26 are bolted together and by means of lock nuts and suitable spacers the angles between the planes of the plates can be varied to correctly orient slotted blocks 11 with bracket 9. An upright bar 27 extends between plates 25 and 26 and is joined at its upper end to bracket 22. The lower end of bar 27 is fixed to roller arrangement 21 by means of a bolt 28 extending through plate 26. This serves to keep plate 26 upright between block 23 and bar 27.

The bracket 22 secured to the top of rods 20 serves two purposes. Firstly it actuates two limit switching devices on a bar 29 fixedly extending from block 23. The limit switching devices are positioned on bar 29 so as to be respectively actuated when crests and troughs of the web 3 are encountered by roller arrangement 21. That is, when the bracket 22 is at its lowermost and uppermost positions with respect to bar 29 respectively.

The limit switching devices can be any suitable position sensitive switching device and operate a modulating motor (not shown) of any suitable type. The modulating motor acts via arms 30 and 31 on plate 26 to which arm 31 is bolted at 32 (shown in FIG. 2). The motor moves arm 31 longitudinally backward or forward so that plate 26 pivots about the bolt 28 holding it to roller arrangement 21. In this way plate 25, plate 12 and slotted blocks 11 can be inclined at different angles. Because bracket 9 holding welding gun 6 is held by blocks 11 the welding gun can in this manner be adjusted to maintain the welding angle constant. In operation the limit switches are respectively operated as the roller arrangement reaches the bottom of each trough and the top of each crest. The limit switches in turn operate to reverse the direction of the modulating motor which adjusts the position of the welding gun at a selected rate corresponding to the changing direction of the welding path as it follows the corrugations. By positioning the roller arrangement 21 to encounter the corrugations ahead of the guide roller 10 it is possible to compensate for lag in the adjusting of the welding gun to maintain the welding angle constant. In addition, suitable adjustment of the position at which the roller arrangement forming part of the member to follow the corrugations encounters each corrugation with respect to the position at which roller 10 encounters the same corrugation allows girders comprising webs with non-parallel corrugations to be fabricated.

The foregoing describes only one embodiment of this invention and modifications may be made thereto without departing from the scope of the invention. For example, the mechanical sensing, switching and adjusting mechanisms described above can equally be replaced with electric, electronic or electro-mechanical devices or a combination of such devices.

I claim:

1. An apparatus for fabricating a plate web girder of the kind comprising two flanges spaced apart by a web, said apparatus comprising a plurality of welding devices each mounted on respective spaced apart guides to follow a respective portion of a welding path defined by the intersection of said web and a flange, each said guide including means to bear against the flange to maintain the welding device at a predetermined distance from said flange adjacent the respective welding path at each point along the path, and means to move said girder longitudinally relative to said welding devices.

2. An apparatus as claimed in claim 1, wherein said welding devices are positioned in a linear array at equally spaced apart locations.

3. An apparatus as claimed in claim 1 or claim 2 wherein each guide bears against the web adjacent the respective welding path to maintain the welding device at a predetermined distance from the web at each point along the path.

4. An apparatus as claimed in claim 1 wherein said means to bear against the flange is adjustable to adjust the predetermined distance of said welding device from the flange.

5. An apparatus as claimed in claim 1 wherein said girder is moved at a substantially constant rate.

6. An apparatus as claimed in claim 1 wherein said web is a corrugated web having corrugations extending generally transverse to the longitudinal extent of the girder and said each guide includes means to maintain the welding angle between the welding path and the welding device substantially constant for each point along said path.

7. An apparatus as claimed in claim 6 wherein means to maintain said welding angle is responsive to movement of the respective guide over the corrugations of said web.

8. An apparatus as claimed in claim 7 wherein means to maintain said welding angle includes a member to follow the corrugations of said web and adapted to operate limit switching devices when the crests and troughs of each corrugation are encountered by said member.

9. An apparatus as claimed in claim 8 wherein said member to follow the corrugations is positioned to encounter the corrugations ahead of the part of the guide bearing against the web to compensate for lag in adjusting the welding device to maintain the welding angle.

10. An apparatus as claimed in claim 8 or claim 9 wherein said limit switches a modulating motor connected with said welding device to adjust said welding device at a selected rate.

11. An apparatus as claimed in claim 8 wherein the position at which said member encounters each corrugation is adjustable with respect to the position at which the part of the guide bearing against the web encounters the same corrugation to facilitate the welding of girders comprising webs with non-parallel corrugations.

12. An apparatus as claimed in claim 6 wherein said girder is moved at a rate varied to achieve a substantially constant speed of the welding devices along said welding path.

13. A method of fabricating a corrugated plate web girder of the kind comprising two flanges spaced apart by a corrugated web having corrugations extending generally transverse to the longitudinal extent of the girder, said method comprising the steps of positioning said flanges relative to said web, positioning a plurality of welding devices at spaced apart locations along said girders, said devices being adapted to follow a respective portion of a welding path defined by the intersection of said web and a flange, actuating said devices and simultaneously moving said girder longitudinally relative to said devices while maintaining each welding device at a predetermined distance from the web and from the flange adjacent the welding path at each point along the path, and maintaining the welding angle between the respective welding path and the respective welding device substantially constant for each point along said path by adjusting the respective welding devices in response to movement of the guide over the corrugations of said web.

14. A method as claimed in claim 13 further comprising the steps of positioning said welding devices at equally spaced apart locations and moving said girder for a distance equal to the distance between adjacent devices.

15. A method as claimed in claim 13 or claim 14 wherein said girder is moved at a rate varied to achieve a substantially constant speed of the welding devices along said welding path.

* * * * *